(12) United States Patent
Frederick, Jr. et al.

(10) Patent No.: US 11,493,157 B2
(45) Date of Patent: Nov. 8, 2022

(54) FLUSH JOINT HIGH TORQUE THREAD

(71) Applicant: Iron Wolf Threaded Products, LLC, Austin, TX (US)

(72) Inventors: Robert Steven Frederick, Jr., Canyon Lake, TX (US); Mark Allen Reeves, Houston, TX (US); Gunther von Gynz-Rekowski, Montgomery, TX (US)

(73) Assignee: IRON WOLF THREADED PRODUCTS, LLC, Austin, TX (US)

( * ) Notice: Subject to any disclaimer, the term of this patent is extended or adjusted under 35 U.S.C. 154(b) by 192 days.

(21) Appl. No.: 17/020,148

(22) Filed: Sep. 14, 2020

(65) Prior Publication Data
US 2021/0148493 A1 May 20, 2021

Related U.S. Application Data

(63) Continuation of application No. 16/687,307, filed on Nov. 18, 2019, now Pat. No. 10,774,959.

(51) Int. Cl.
*F16L 15/06* (2006.01)
*F16L 15/00* (2006.01)
*E21B 17/042* (2006.01)

(52) U.S. Cl.
CPC ............ *F16L 15/06* (2013.01); *F16L 15/001* (2013.01); *E21B 17/042* (2013.01)

(58) Field of Classification Search
CPC ..... F16L 15/001; F16L 15/002; F16L 15/003; F16L 15/004; F16L 15/005; F16L 15/04; F16L 15/08

USPC ......................................... 285/333, 334, 390
See application file for complete search history.

(56) References Cited

U.S. PATENT DOCUMENTS

| | | | | | |
|---|---|---|---|---|---|
| 4,917,409 | A | * | 4/1990 | Reeves | F16L 15/003 285/390 |
| 4,946,201 | A | * | 8/1990 | Tai | E21B 17/042 285/94 |
| 5,064,224 | A | * | 11/1991 | Tai | E21B 17/042 285/94 |
| 6,244,631 | B1 | * | 6/2001 | Payne | E21B 17/042 285/333 |
| 6,322,110 | B1 | * | 11/2001 | Banker | E21B 17/0423 285/333 |
| 6,347,814 | B1 | * | 2/2002 | Cerruti | E21B 17/08 285/333 |
| 6,481,760 | B1 | * | 11/2002 | Noel | F16L 15/06 411/311 |
| 6,485,063 | B1 | * | 11/2002 | Olivier | E21B 17/042 285/333 |

(Continued)

*Primary Examiner* — Aaron M Dunwoody
(74) *Attorney, Agent, or Firm* — Culhane Meadows PLLC; Robert C. Klinger

(57) ABSTRACT

A flush joint high torque thread that achieves superior tensile efficiency and compression efficiency. In one example, the thread of a pin member and a box member includes a thread a chamfer with angled shoulders on each side of the thread to achieve increased torque. The stab flanks each contain a lead-in chamfer extending no further than a thread pitch line. The load flanks are each tapered. The stab flanks engage each other during assembly, but not upon assembly. The load flanks do not engage each other during assembly, and do engage each other upon assembly. The pipe achieves both a 70% tensile efficiency and a 90% compression efficiency.

10 Claims, 12 Drawing Sheets

(56) References Cited

U.S. PATENT DOCUMENTS

| | | | | |
|---|---|---|---|---|
| 7,210,710 | B2* | 5/2007 | Williamson | E21B 17/042 285/333 |
| 8,287,008 | B2* | 10/2012 | Charvet-Quemin | E21B 17/042 285/333 |
| 2002/0113436 | A1* | 8/2002 | Verdillon | F16L 15/004 285/333 |
| 2004/0195835 | A1* | 10/2004 | Noel | E21B 17/042 285/333 |
| 2007/0228729 | A1* | 10/2007 | Grimmett | F16L 15/004 285/333 |
| 2008/0265575 | A1* | 10/2008 | Charvet-Quemin | E21B 17/042 285/331 |
| 2011/0227338 | A1* | 9/2011 | Pollack | F16L 15/004 285/390 |
| 2013/0277963 | A1* | 10/2013 | Carrois | F16L 15/006 285/333 |
| 2014/0054891 | A1* | 2/2014 | Ames | F16L 15/004 285/390 |
| 2014/0265320 | A1* | 9/2014 | Pollack | E21B 17/042 285/334 |
| 2014/0300104 | A1* | 10/2014 | Pollack | F16L 15/004 285/333 |
| 2014/0333065 | A1* | 11/2014 | Pacheco | F16L 15/001 285/334 |
| 2014/0367119 | A1* | 12/2014 | David | F16L 15/001 166/380 |
| 2015/0252921 | A1* | 9/2015 | Schulte | F16L 15/06 285/390 |
| 2017/0321494 | A1* | 11/2017 | McLaughlin | E21B 41/02 |

* cited by examiner

| Owner | Connection | Pipe Data | OD | Tensile Efficiency: | Compressive Efficiency: | Maximum Bend: | Nominal Shoulder Torque: | Minimum Makeup Torque: | Optimum Makeup Torque: | Maximum Makeup Torque: | Minimum Yield Torque: |
|---|---|---|---|---|---|---|---|---|---|---|---|
| LFS | FJ-HT | P-110 | 3.5 | 70.0% | 90.0% | 86.00 | 500 | 2,500 | 3,800 | | 5,500 |
| TMK | Ultra FJ | P-110 | 3.5 | 62.1% | 62.1% | 89.40 | | 2,800 | 3,100 | 3,400 | 5,000 |
| Precision | OG Premium Flush | P-110 | 3.5 | 62.0% | 62.0% | 89.00 | 1,000 | 1,800 | 2,000 | 2,200 | |
| Precision | Hydra Flush | P-110 | 3.5 | 60.0% | | 91.00 | 400 | 2,175 | 2,575 | 2,975 | |
| VAM | VAM FJL | P-110 | 3.5 | 54.8% | 21.9% | 10.00 | | 1,240 | 1,370 | 1,500 | |
| EZGO | EZGO FJ3 | P-110 | 3.5 | 50.0% | 50.0% | 40.80 | | 1,400 | | 1,800 | |
| LFS | FJ-HT | P-110 | 4 | 70.0% | 90.0% | 76.00 | 1,300 | 4,100 | 5,800 | 6,000 | 8,400 |
| TMK | Ultra FJ | P-110 | 4 | 65.0% | 65.0% | 82.20 | | 3,600 | 4,000 | 4,400 | 6,400 |
| Precision | Hydra Flush | P-110 | 4 | 60.0% | | 80.00 | 480 | 3,050 | 3,675 | 4,275 | |
| EZGO | EZGO FJ3 | P-110 | 4 | 56.5% | 56.5% | 42.70 | | 1,600 | | 2,000 | |

FIG. 13 ns particularly pointed out in the appended claims.
FLUSH JOINT HIGH TORQUE THREAD

TECHNICAL FIELD

The present disclosure generally relates to a thread design for a oil & gas pipe.

BACKGROUND

Oil & gas pipes typically included a pin member and box member. Different designs produce different technical performance. Some pipe designs achieve good tensile efficiency, and other designs achieve good compression efficiency. There are tradeoffs associated with different designs.

BRIEF DESCRIPTION OF THE DRAWINGS

In the drawings, which are not necessarily drawn to scale, like numerals may describe similar components in different views. Like numerals having different letter suffixes may represent different instances of similar components. Some examples are illustrated by way of example, and not limitation, in the figures of the accompanying drawings in which:

FIG. 12A-12D illustrates thread form assembly progression and FIG. 13 illustrates tensile capacity and compression capacity of the pipe.

DETAILED DESCRIPTION

Figure 1:
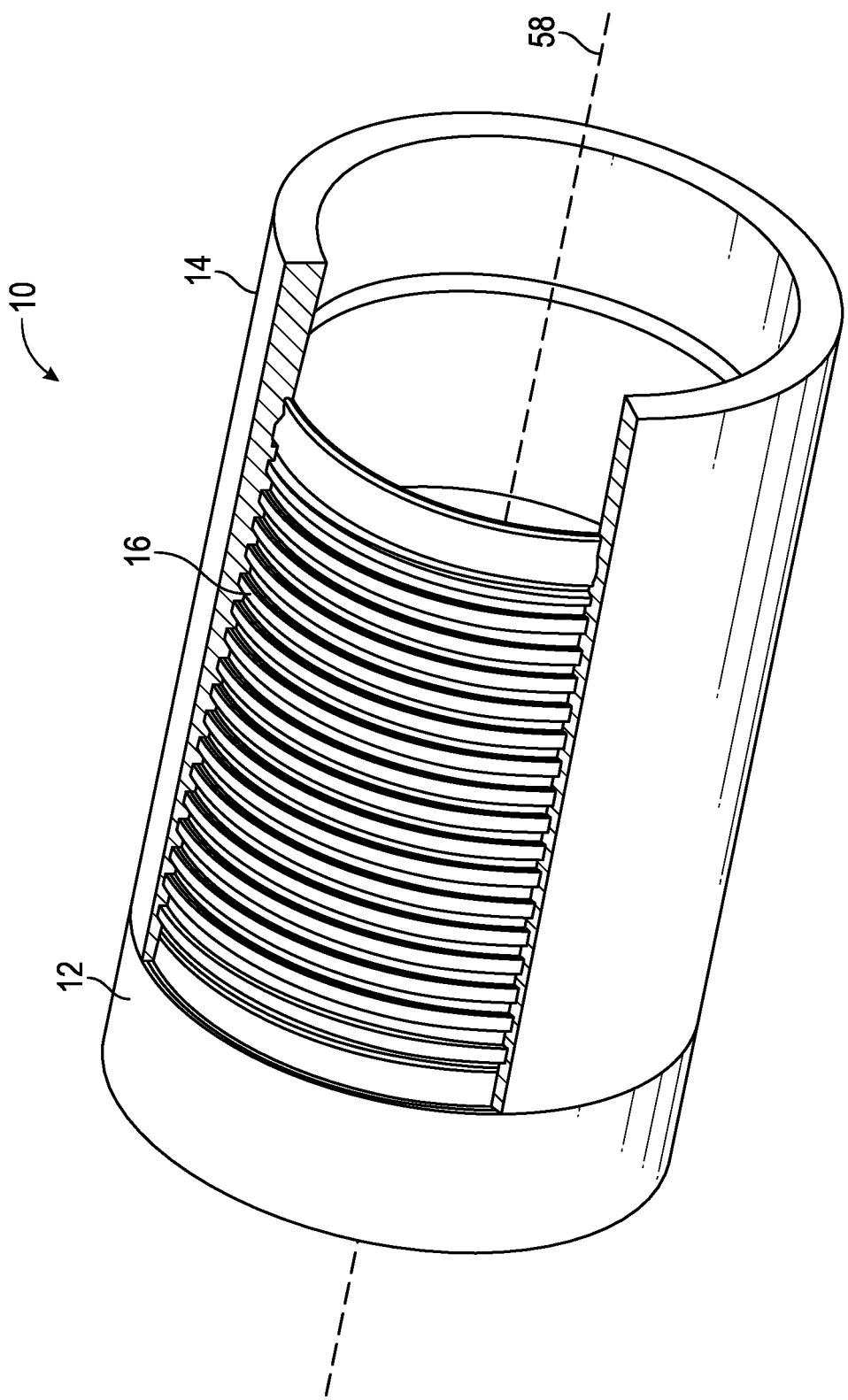
FIG. 1 illustrates a perspective 3-quarter section of a pipe.

One aspect of this disclosure describes a flush joint high torque thread that achieves superior tensile efficiency and compression efficiency. In one example, the thread of a pin member and a box member includes a thread a chamfer with angled shoulders on each side of the thread to achieve increased torque. The stab flanks each contain a lead-in chamfer extending no further than a thread pitch line. The load flanks are each tapered. The stab flanks engage each other during assembly, but not upon assembly. The load flanks do not engage each other during assembly, but do engage upon assembly. The pipe achieves both a 70% tensile efficiency and a 90% compression efficiency.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

The description that follows includes systems, methods, techniques, instruction sequences, and computing machine program products illustrative of examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

The terms and expressions used herein are understood to have the ordinary meaning as is accorded to such terms and expressions with respect to their corresponding respective areas of inquiry and study except where specific meanings have otherwise been set forth herein. Relational terms such as first and second and the like may used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below.

Figure 6A:
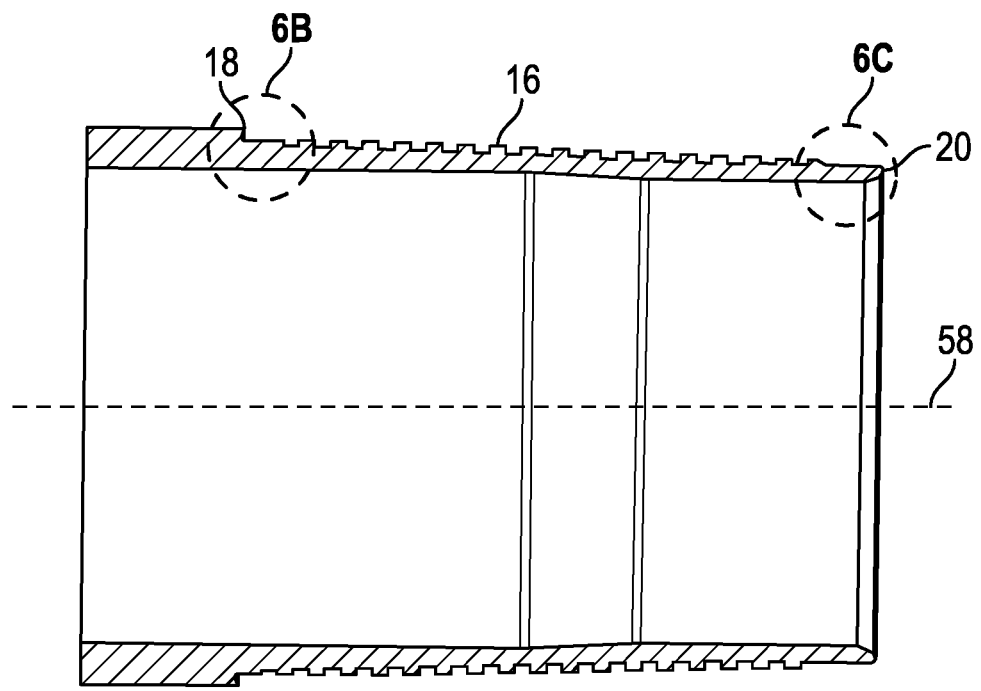
FIG. 6A-6C illustrate pin torque shoulder details.
Figure 6B:
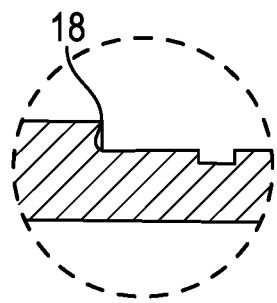
Figure 6C:
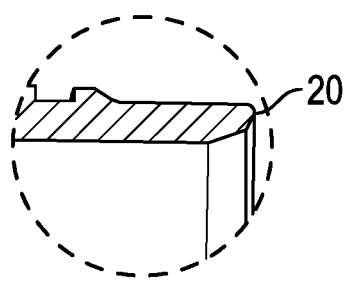
Figure 7A:
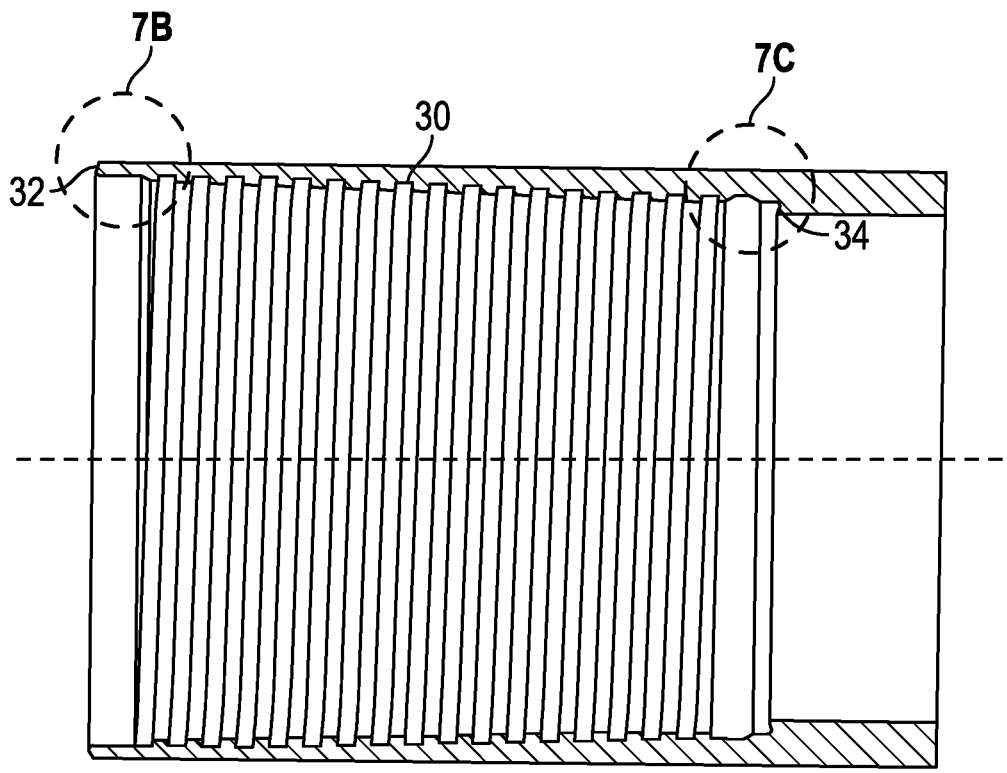
FIG. 7A-7C illustrate assembled torque shoulder details.
Figure 7B:
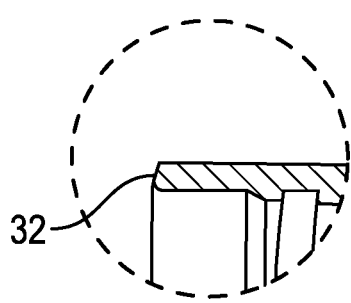
Figure 7C:
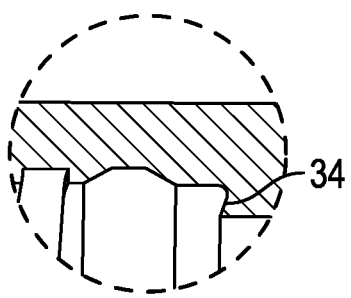
Figure 10:
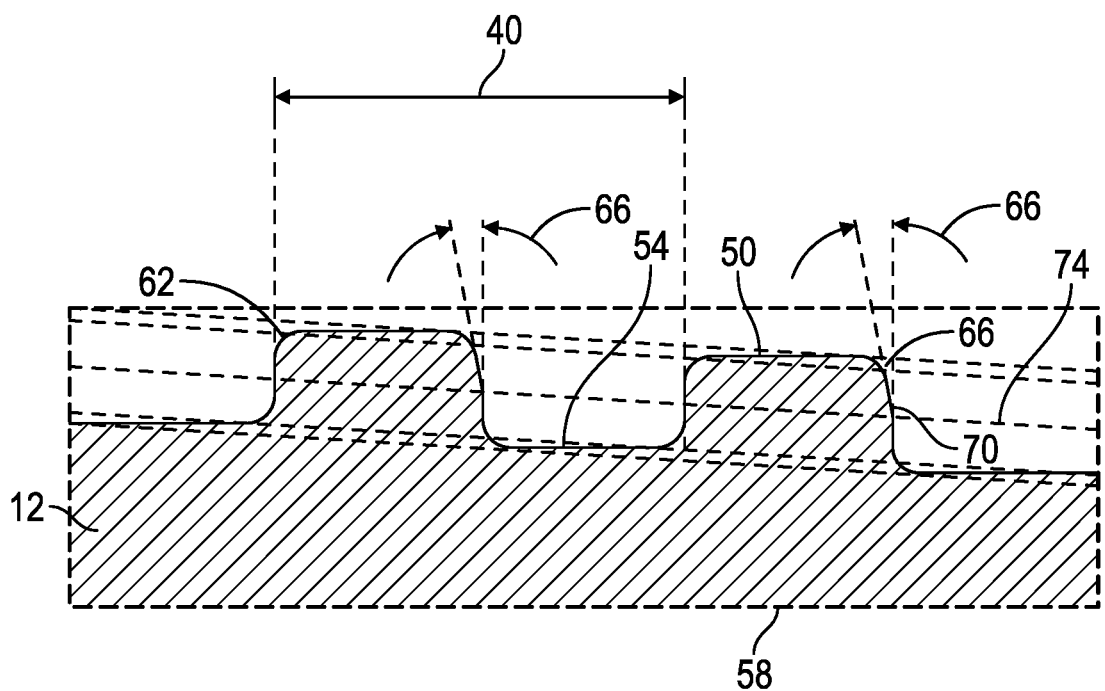
FIG. 10 illustrates pin member thread form detail.

Referring to FIG. 1, there is shown a perspective view of a pipe 10 having a flush joint high torque (FJ-HT) threaded connection including pin member 12 and box member 14. The pin member 12 has external, tapered threads 16 with an external shoulder 18 and an internal shoulder 20 (FIG. 6A-6C). The box member 14 has internal, tapered threads 30 with an external shoulder 32 and an internal shoulder 34 (FIG. 7A-7C). Both the pin member 12 and box member 14 have the same thread pitch 40 (FIG. 10). The pin member 12 and the box member 14 each include interfering cylindrical surfaces forming a metal-to-metal seal.

Figure 2:
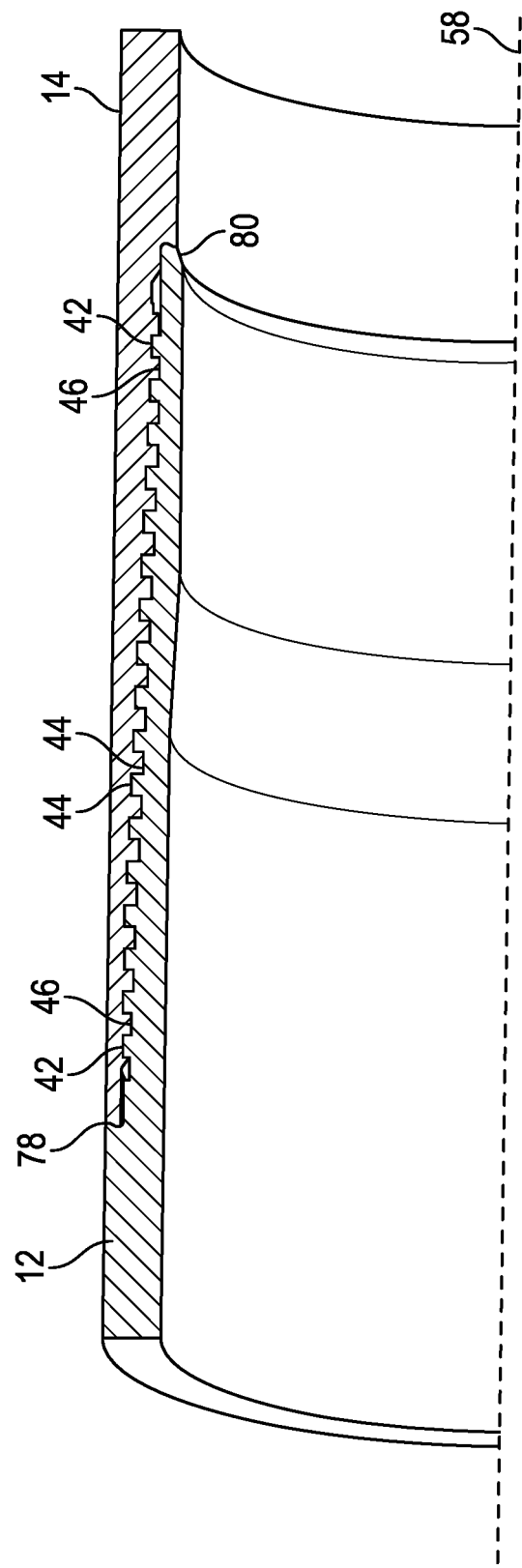
FIG. 2 illustrates a perspective half section of the pipe.
Figure 9:
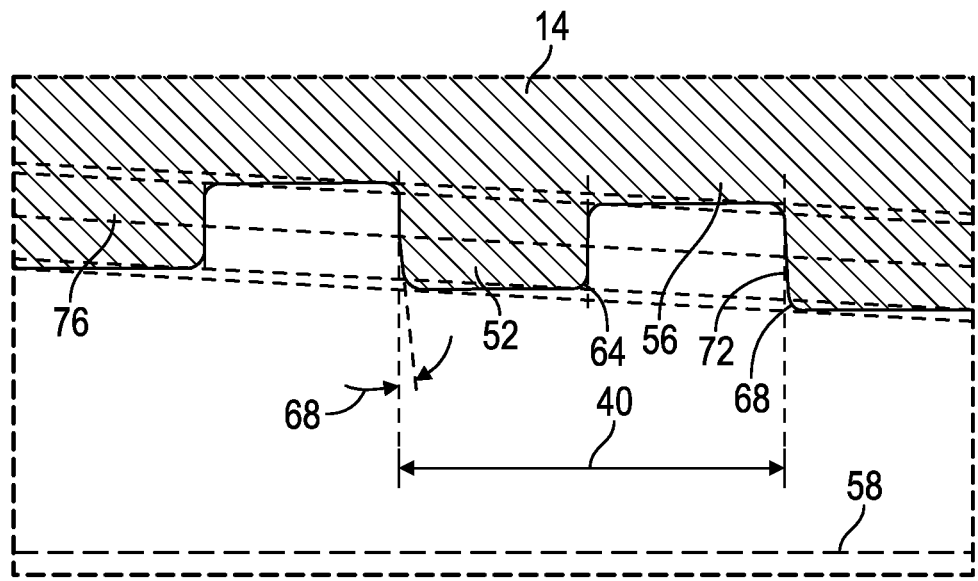
FIG. 9 illustrates the box member thread form detail.
Figure 12A:
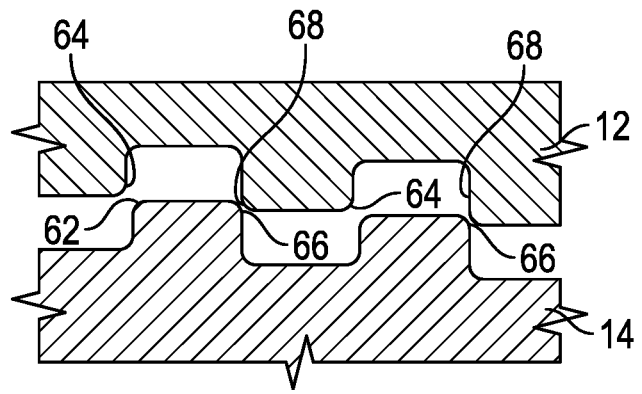
Figure 12B:
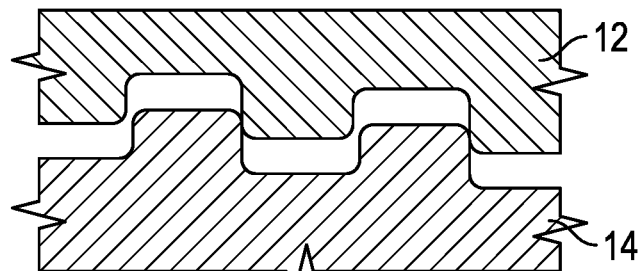
Figure 12C:
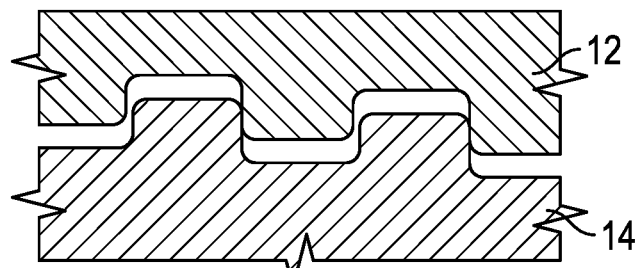
Figure 12D:
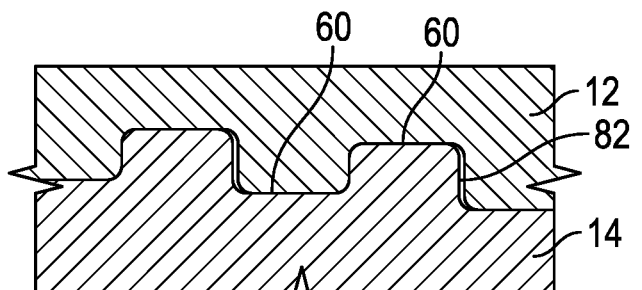

Referring to FIG. 2, FIG. 9 and FIG. 10, both the pin member 12 and box member 14 have run-in threads 42, full height threads 44, and run-out threads 46. The threads are square, or near-square as shown, with crests 50 and 52 and thread roots 54 and 56 parallel to a connection axis 58. The thread crests 50 and 52 have the same width as thread roots 54 and 56. The thread crests 50 and 52 and thread roots 54 and 56 have zero clearance or some radial interference 60 (FIG. 12D) when fully assembled. Opposing load flanks 62 and 64 and opposing stab flanks 66 and 68 are perpendicular or near-perpendicular to the connection axis 58 and thus have a zero-degree flank angle.

Notably, each of the load flanks 62 and 64 are tapered. Further, the stab flanks 66 and 68 each contain a lead-in taper, chamfer, or radius 70 and 72, respectively, extending no further than a thread pitch line 74 and 76, respectively, from the thread crests 50 and 52 for ease of stabbing the threads 18 and 30 during assembly. Thus, the stab flanks have a positive flank angle. The radii of chamfer 70 and 72 of stab flanks 66 and 68, respectively, are greater than the radii of tapered load flanks 62 and 64, and extend closer to a thread pitch line 74 and 76 extending roughly through the middle of the threads 18 and 30, as shown. Notably, the tapered stab flanks 66 and 68 between the pin member 12 and box member 14 are not in contact when fully assembled, but rather, are spaced from one another as shown at 82 in FIG. 12D, to help produce extreme high tension and high compression metrics.

Figure 3A:
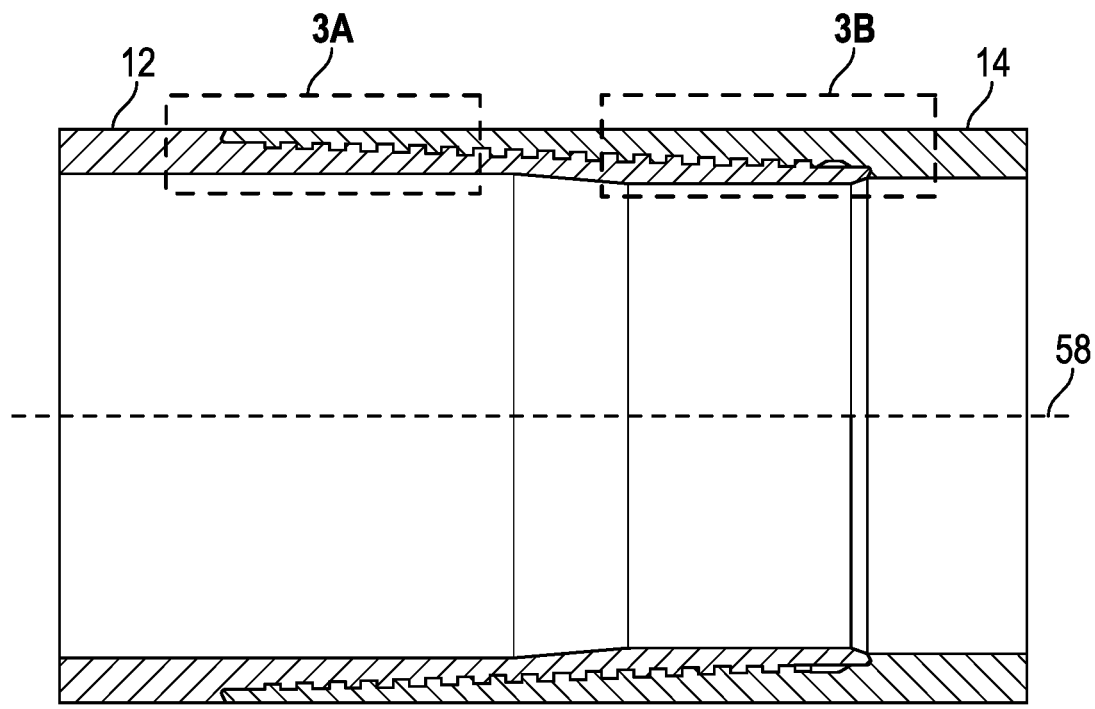
FIG. 3A-3C illustrate section details of external and internal shoulders.
Figure 3B:
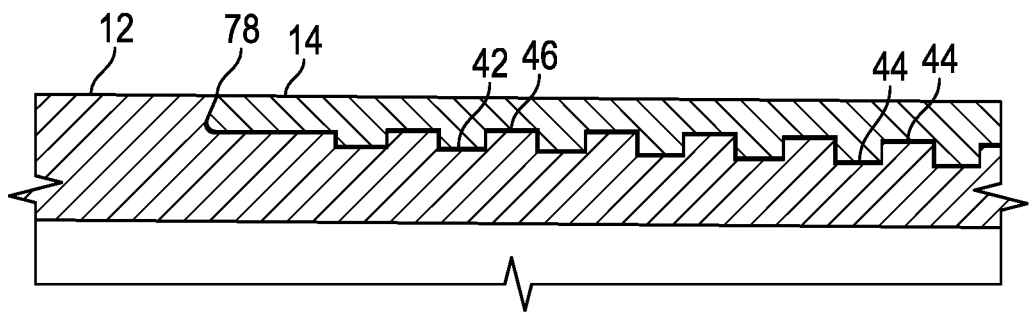
Figure 3C:
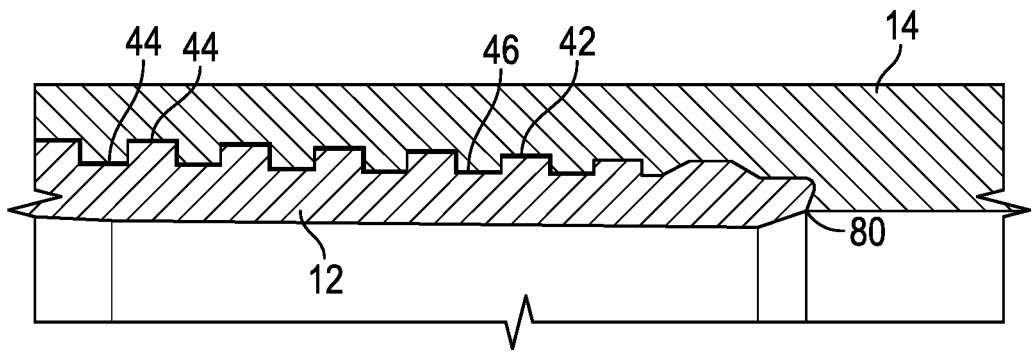

Referring to FIGS. 3A and 3B, the pin external shoulder 18 and box external shoulder 32 form a metal-to-metal seal and a primary torque external shoulder 78. The external shoulder 78 may be conical such that the pin external shoulder 18 constrains the box external shoulder 32 in the radial direction. The pin internal shoulder 20 and box internal shoulder 34 form a metal-to-metal seal and a secondary torque internal shoulder 80 as shown in FIG. 3C. The internal shoulder 80 may be conical such that the box internal shoulder 34 constrains the pin internal shoulder in the radial direction.

Figure 4A:
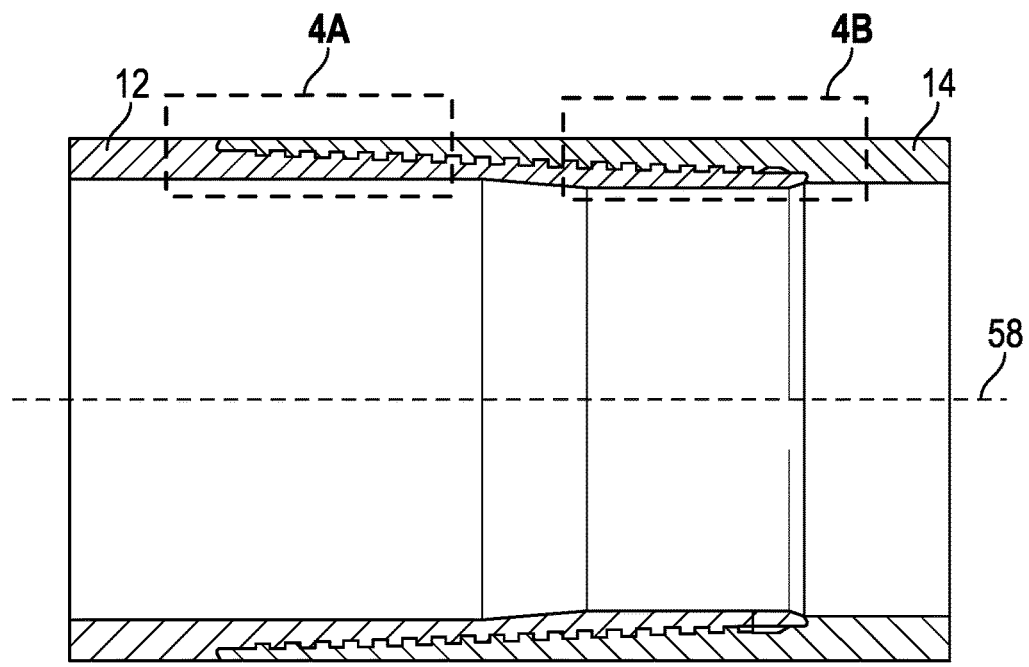
FIG. 4A-4C illustrate section details with tension variable dimensions.
Figure 4B:
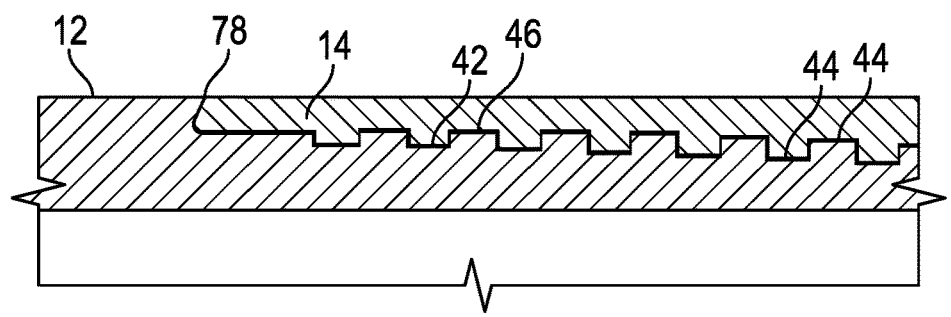
Figure 4C:
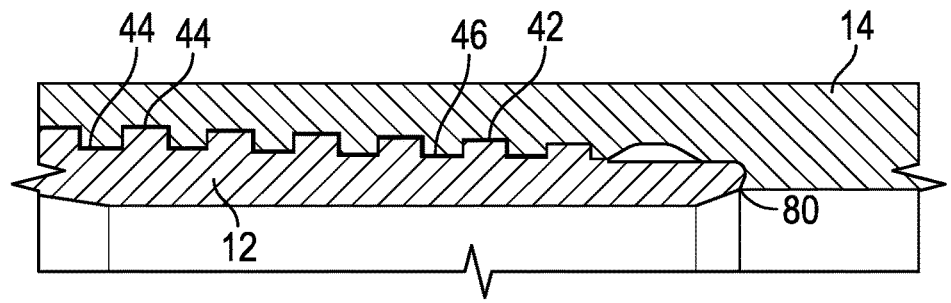

FIG. 4A-4C illustrate section details of pin member 12 with tension variable dimensions. FIG. 4B illustrates the pin member 12 including the critical diameter (CD) of tapered thread 16 (root of last engaged thread or relief diameter for box and pin), the inner diameter (ID) of pin member 12, the outer diameter (OD) of pin member 12, and mid pipe diameter (MD) of the pin member 12 where the mid diameter is (OD+ID)/2, and the pipe wall thickness (WT) is defined as (OD−ID)/2.

FIG. 4C illustrate section details of box member 14 with compression variable dimensions. FIG. 4C illustrates the box member 14 including the CD of tapered thread 30, the ID of box member 14, the OD of box member 14, and MD of the box member 14 where the MD is (0D+ID)/2, and the WT is defined as (OD−ID)/2.

Figure 5A:
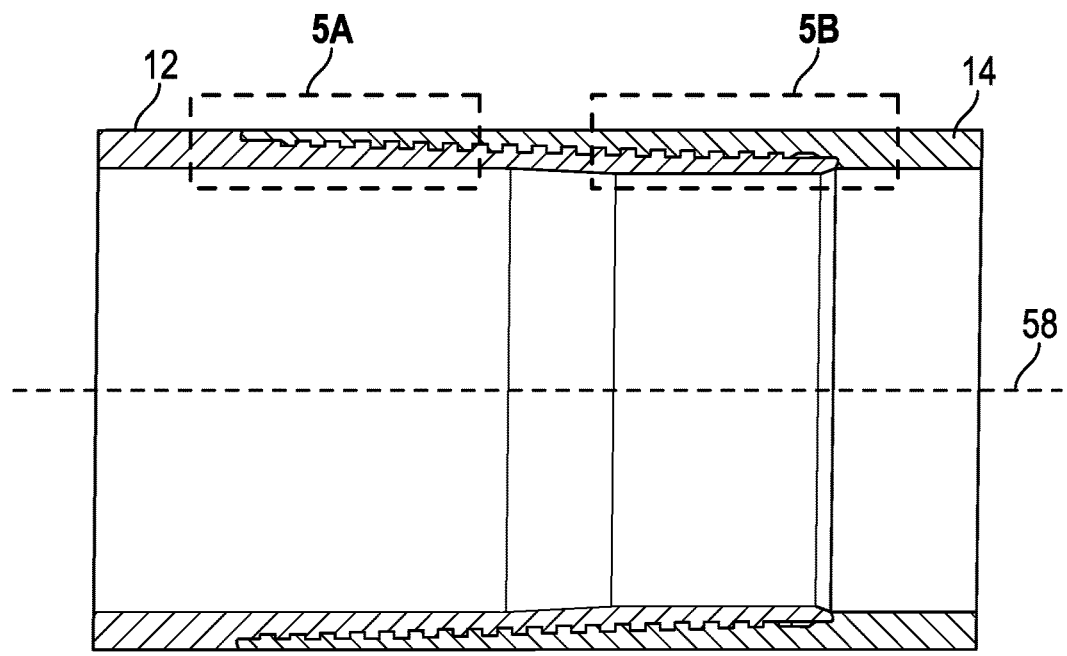
FIG. 5A-5C illustrate section details with compression variable dimensions.
Figure 5B:
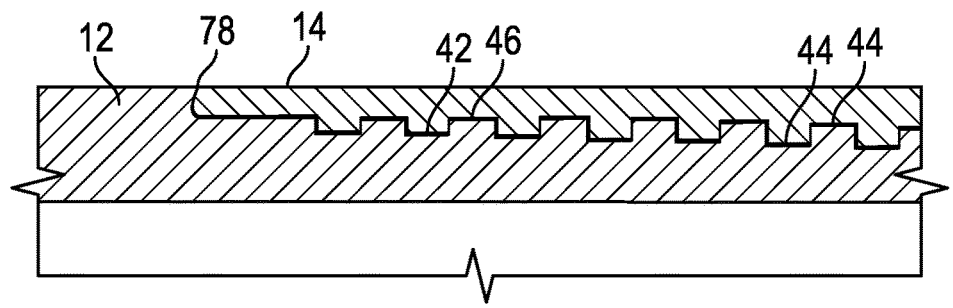
Figure 5C:
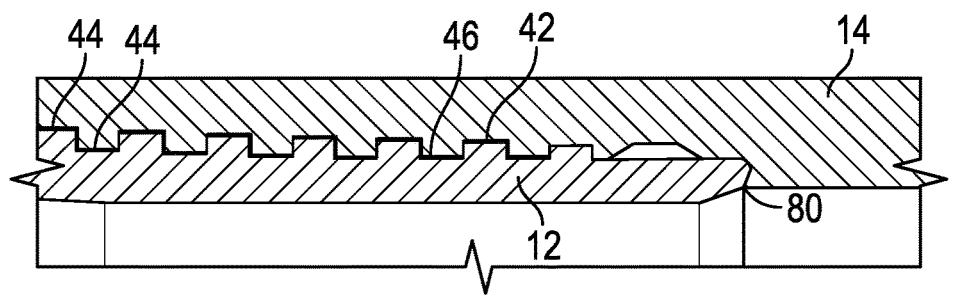

FIG. 5A-5C illustrate section details of pin member 12 and box member 14 with compression variable dimensions, where Ae=Area of the external shoulder 18, and Ai=Area of the internal shoulder 20, and Ap=Area of the pipe body.

FIG. 6A-6C illustrate the details of pin shoulders 18 and 20. As shown, each shoulder 18 and 20 is tapered to increase tension when engaged by shoulder 32 and 34 of the box member 14, as shown in FIG. 7A-7C.

Figure 8A:
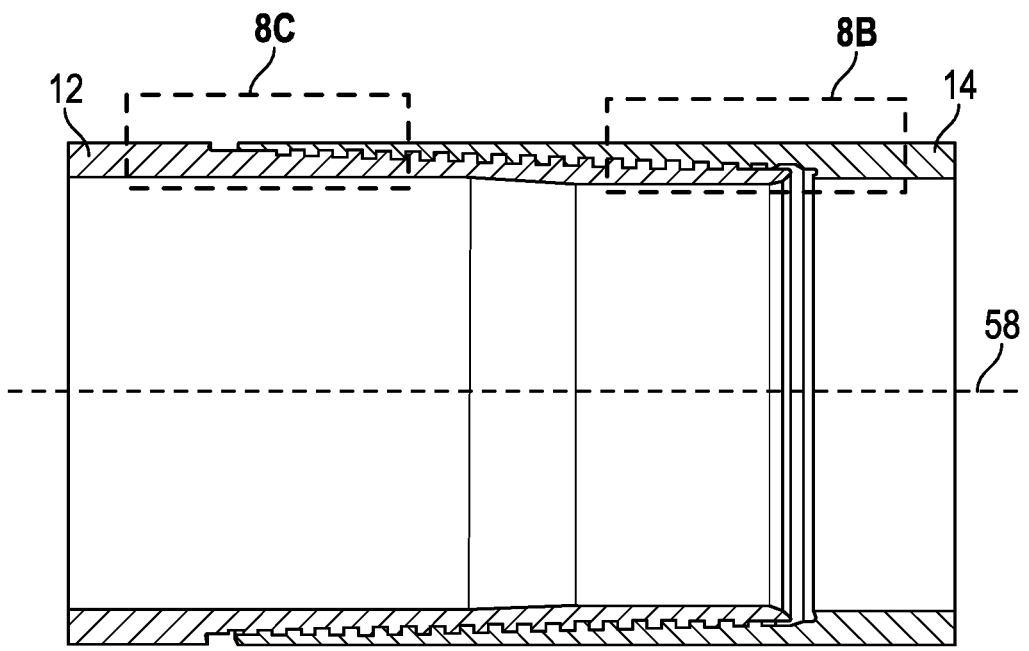
FIG. 8A-8C illustrates the thread partially assembled.
Figure 8B:
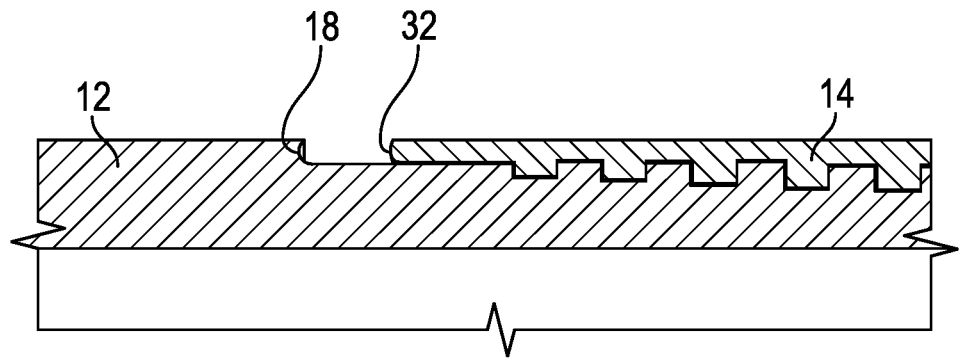
Figure 8C:
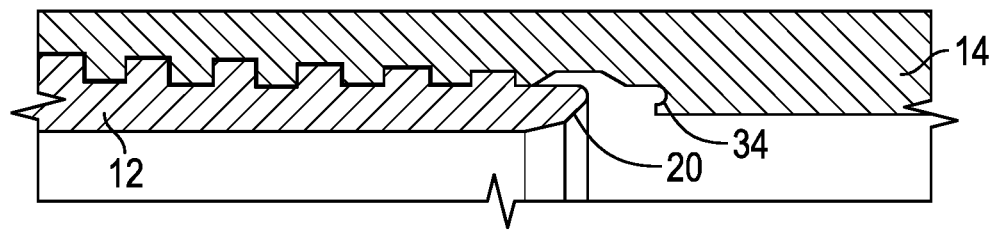

FIG. 8 illustrates the thread partially assembled, before the box member 14 shoulders 32 and 34 engage pin member 12 shoulders 18 and 20.

Figure 11:
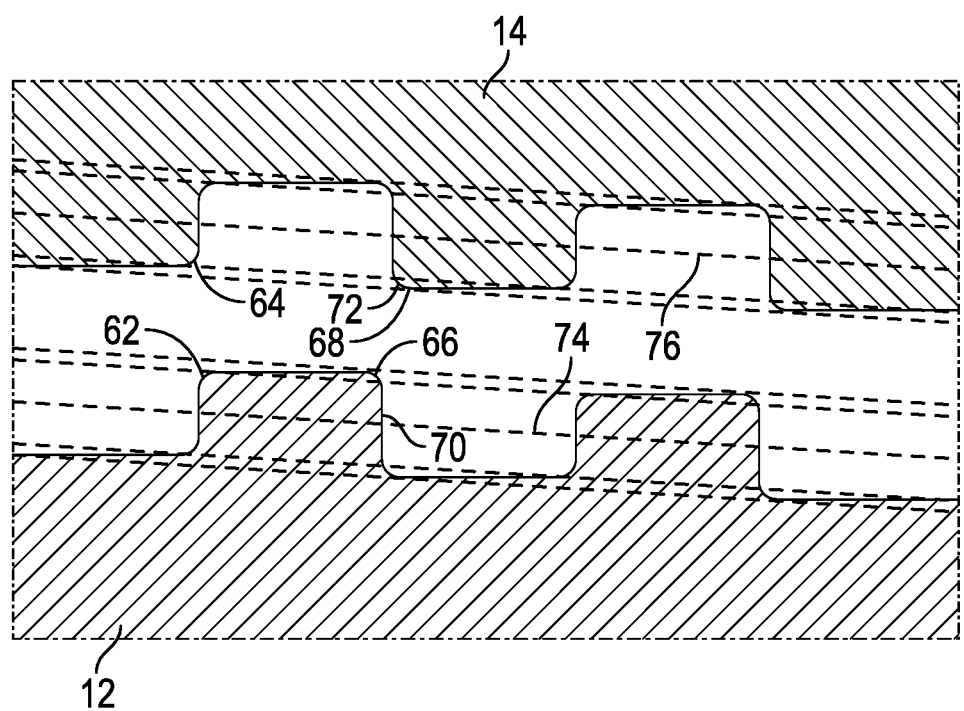
FIG. 11 illustrates box and pin member thread form detail.

FIG. 11 illustrates the pin member 12 and box member 14 details. The tapered load flanks 62 and 64, and also the lead-in tapered stab flanks 66 and 68 together help produce the extreme high tension and high compression metrics of this disclosure, along with the spacing 82 established between the stab flanks 66 and 68 of the pin member 12 and box member 14 as previously discussed.

During assembly, as shown in FIGS. 12A-12D, the pin member 12 is stabbed into the box member 14 and rotated relative to each other about the connection axis 58. The chamfers 70 and 72 of stab flanks 66 and 68 engage and guide the tapered thread 16 such that the pin thread crests 50 contact the box thread roots 54 and box thread crests 52 contact the pin thread roots 56. The box and pin load flanks 62 and 64 do not engage initially, but do engage upon completion of assembly, producing a reactive force against any thread crest and root interference 60 and the external and internal shoulder contacts 78 and 80, respectively. As the pin member 12 and box member 14 are rotated relative to one another about the connection axis 58, the engaged load flanks 62 and 64 produce increasing reactive force, further compressing the external shoulder 78 and internal shoulder 80. Relative rotation is stopped once sufficient shoulder compression is achieved, and the chamfers 70 and 72 do not engage.

Once fully assembled the threads 42, 44 and 46, pin member 12, and box member 14 will bear tensile loads along the central axis 58 of the connection. The external shoulder 78 and internal shoulder 80 will each bear compressive loads along the central axis 58 of the connection.

The pin member 12 and box member 14 tensile capacities are each defined by a ratio. Both the pin member 12 and box member 14 must meet the ratio with the specified design constants to meet the constant's corresponding tensile % of yield, where the % of yield is defined as the ratio between applied stress and material's yield stress. This pipe has the following tension and compression metrics:

Tension

Tension is defined as:

$$\left[\frac{WT \cdot MD}{OD \cdot |MD - CD|} \cdot C\right] \leq 1,$$

Where:
WT=pipe wall thickness (OD−ID)/2
MD=pipe mid diameter (OD+ID)/2
ID=pipe outer diameter
ID=pipe inner diameter
CD=critical diameter of thread. (root of last engaged thread or relief diameter for box and pin)
CD of the Pin must be greater than MD
CD of the Box must be less than MD
C=thread design constant

| % yield | C, Design Constant |
|---|---|
| ≥90% | C ≥0.88 |
| ≥75% | C ≥0.57 |
| ≥60% | C ≥0.26 |

Compression

The external shoulder 78 and internal shoulder 60 capacities are defined by two ratios and both must be met to guarantee at least a 40% compression efficiency, with compression efficiency defined as the maximum strength of the shoulder over the maximum strength of the pipe.

$$\frac{1}{\sqrt{3}} \leq \frac{A_e}{A_i} \leq \sqrt{3}$$

$$\frac{A_e}{A_p} \geq \frac{1}{4} \leq \frac{A_i}{A_p}$$

Where:
Ae=Area of the external shoulder
Ai=Area of the internal shoulder
Ap=Area of the pipe body The significant tensile capacity and compression capacity of pipe 10 as measured is shown in FIG. 13, wherein the owner LFS and connection FJ-HT refers to the pipe 10 of this disclosure, in comparison to some of the most well know pipes currently available. The performance and metrics of pipe 10 includes at least 70% tensile efficiency, and at least 90% compression efficiency, which is extremely efficient and a technical advantage that has not been previously achieved.

The FJ-HT thread 18 and 30 is mainly characterized throughout the following specifics:
  Square thread profile for efficient load transmission
  Double shoulder connection with tapered external and internal shoulders to maximize MUT
  Stab flanks are spaced from each other when assembled
  High Torque Flush Joint connection
  Cylindrical run-in and run-out threads for maximum connection strength
  Taper and threads per inch selected for minimum turns to shoulder
  Coarse thread profile for better durability
  Optimized tensile-compression-ratio connection In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

What is claimed is:

1. A tubular connection comprising:
  a first pipe comprising a first material having a yield stress, and comprising a pin member having an external tapered thread;
  a second pipe comprising the first material and comprising a box member having an internal tapered thread;
  wherein the pin member and the box member meet a tension ratio with a design constant C to meet a corresponding tensile % of yield, where the tensile % of yield is defined as the ratio between an applied stress and the first material yield stress;
  wherein the tension ratio is defined as:

$$\left[\frac{WT \cdot MD}{OD \cdot |MD - CD|} \cdot C\right] \leq 1,$$

Where:
  WT=first and second pipe wall thickness (OD−ID)/2
  MD=first and second pipe mid diameter (OD+ID)/2
  OD=first and second pipe outer diameter
  ID=first and second pipe inner diameter
  CD=critical diameter of the threads
    CD of the pin member is greater than MD
    CD of the box member is less than MD
  C=design constant of the threads

| % yield | C, Design Constant |
|---|---|
| ≥90% | C ≥0.88 |
| ≥75% | C ≥0.57 |
| ≥60% | C ≥0.26 |

2. The tubular connection of claim 1, wherein the first pipe has an internal shoulder and the second pipe has an external shoulder configured to engage the first pipe internal shoulder to form the first torque shoulder, wherein the first pipe has an external shoulder and the second pipe has an internal shoulder configured to engage the first pipe external shoulder to form the second torque shoulder, wherein the tubular connection has at least a 40% compression efficiency defined as a maximum strength of the first and second torque shoulders over a maximum strength of the first and second pipes, where:

$$\frac{1}{\sqrt{3}} \leq \frac{A_e}{A_i} \leq \sqrt{3}$$

$$\frac{A_e}{A_p} \geq \frac{1}{4} \leq \frac{A_i}{A_p}$$

where:
  Ae=Area of the external shoulder
  Ai=Area of the internal shoulder
  Ap=Area of the first and second pipe.

3. The tubular connection of claim 1 wherein the pin member and the box member each include interfering cylindrical surfaces configured to form a metal-to-metal seal upon assembly.

4. The tubular connection of claim 1 wherein the threads have crests and roots, wherein the crests and the roots are configured to have a radial interference upon assembly.

5. The tubular connection of claim 1 wherein the pin member and the box member each have run-in threads, full height threads, and run-out threads.

6. The tubular connection of claim 1 wherein the tubular connection has a tensile efficiency of at least 70%.

7. The tubular connection of claim 1 wherein the tubular connection has a compression efficiency of at least 90%.

8. The tubular connection of claim 6 wherein the tubular connection has a compression efficiency of at least 90%.

9. The tubular connection of claim 1 wherein pin member and the box member each have an outer diameter of 3.5 inches, and a minimum yield torque of 5500 ft-lbs.

10. The tubular connection of claim 1 wherein pin member and the box member each have an outer diameter of 4 inches, and a minimum yield torque of 8400 ft-lbs.

\* \* \* \* \*